(12) United States Patent
Kawakami et al.

(10) Patent No.: US 6,558,847 B1
(45) Date of Patent: *May 6, 2003

(54) METAL OXIDE OF POROUS STRUCTURE, ELECTRODE STRUCTURE, SECONDARY BATTERY, AND METHODS FOR PRODUCING THEM

(75) Inventors: Soichiro Kawakami, Nara (JP); Tomoya Yamamoto, Nara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,353

(22) Filed: Sep. 16, 1999

(30) Foreign Application Priority Data

Sep. 18, 1998 (JP) .............................. 10-282085

(51) Int. Cl.[7] .......................... H01M 4/48; H01M 10/40
(52) U.S. Cl. .............................. 429/231.95; 429/218.1; 429/231.1; 423/592; 423/593; 423/618
(58) Field of Search .................. 429/231.95, 231.9, 429/218.1, 231.1, 224, 223; 423/593, 618, 592

(56) References Cited

U.S. PATENT DOCUMENTS

| 5,698,339 A | 12/1997 | Kawakami et al. ......... 429/212 |
| 5,702,845 A | 12/1997 | Kawakami et al. ......... 429/224 |
| 5,824,434 A | 10/1998 | Kawakami et al. ......... 429/209 |
| 5,888,670 A | 3/1999 | Kawakami ............... 429/231.4 |
| 5,958,624 A | * 9/1999 | Frech et al. ............ 429/231.95 |

FOREIGN PATENT DOCUMENTS

| JP | 8-321306 | 12/1996 |
| JP | 8-3213000 | 12/1996 |
| WO | 96/39357 | 12/1996 |
| WO | 99/31745 | 6/1999 |

OTHER PUBLICATIONS

A.N. Dey, et al., "The Electrochemical Decomposition of Propylene Carbonate on Graphite", J. Electrochem. Soc., vol. 117, No. 2, pp. 222–224 (1970), February).

M.E. Spahr, et al., "Vanadium Oxide Nanotubes: A New Nanostructures Redox–Active Material for the Electrochemical Insertion of Lithium", J. Electrochem. Soc., vol. 146, No. 8, pp. 2780–2783 (1999) (No Month).

* cited by examiner

*Primary Examiner*—John S. Maples

(57) ABSTRACT

A metal oxide of porous structure intercalating or deintercalating lithium ions by the electrochemical reaction, characterized by being provided with regularly ordered pores.

24 Claims, 3 Drawing Sheets

METAL OXIDE OF POROUS STRUCTURE, ELECTRODE STRUCTURE, SECONDARY BATTERY, AND METHODS FOR PRODUCING THEM

BACKGROUND OF THE INVENTION

1. Field of the Invention

The present invention relates to a lithium-intercalated compound, electrode structure, methods for producing them and lithium secondary battery, more particularly to a lithium-intercalated compound of structure having high capacity and high charge-discharge efficiency; an electrode structure composed of the lithium-intercalated compound of specific structure; a lithium secondary battery, and methods for producing the lithium-intercalated compound material and electrode structure.

2. Related Background Art

Global warming is anticipated, because of the greenhouse effect of $CO_2$ which has been increasingly released into the air. Therefore, construction of new thermal power stations, which release large quantities of $CO_2$, has become increasingly difficult. Devices for nighttime power have been adopted by private houses, to effectively utilize power produced by utilities.

Concept of load leveling has been proposed to use power supplied from a secondary battery in the daytime during which power is consumed more. Secondary batteries of high energy density have been increasingly in demand as the drivers for electric vehicles which release no pollutants. Compact, light, functional secondary batteries are also urgently needed as the power sources for portable devices, such as notebook personal computers, word processors, video cameras, and portable telephones.

The concept of compact, light, functional secondary battery was originally introduced in 1970 (Journal of the Electrochemical Society, 117, 222, 1970), and used a lithium-graphite intercalated compound as the anode for a secondary battery. As the compact, light, functional secondary battery, the rocking chair type secondary battery (the so-called lithium-ion battery) has been developed and commercialized since then. It uses, e.g., carbon (including graphite) as the anode active material and intercalated compound with the lithium ion in-between as the cathode active material. The lithium-ion battery uses the anode of carbon as the host material with lithium as the guest intercalated in-between, to control growth of dendrite during the charging step, thereby increasing charge-discharge cycles.

The lithium-ion battery with carbon as the anode active material, although long in cycle life, has a lower energy density than the lithium battery which uses metallic lithium itself as the anode active material.

Therefore, carbon material of higher capacity has been extensively studied and developed for the anode of the lithium-ion battery. It is also essential to develop cathode materials of higher capacity, in addition to anode materials, in order to realize secondary batteries of higher energy density. At present, transition metal oxides with lithium intercalated in-between are mainly used as the cathode materials. However, discharge capacity of these batteries is limited to 40 to 60% of the theoretical capacity. Therefore, development of cathodes of higher capacity, while having practical cycle life, has been strongly demanded for lithium secondary batteries, including the "lithium-ion battery" which uses lithium ions as the guest for charge/discharge reactions.

Techniques for gel electrolytes have been also extensively developed to prevent electrolyte leakage and facilitate production of batteries of good resistance to overcharge and various shapes by solidifying the electrolytes. Development of electrode materials suited for gel electrolytes, i.e., those forming good interfaces with the gel electrolyte, is also demanded.

The inventors of the present invention have already proposed hollow, porous structures for the active materials of long cycle life and high charge-discharge efficiency (Japanese Patent Application Laid-Open No. 8-321300), and also have been developing the active materials suited for gel-electrolyte batteries of higher performance.

SUMMARY OF THE INVENTION

It is an object of the present invention to provide a lithium-intercalated compound material of structure to have high capacity and high charge-discharge efficiency and suited for gel-electrolyte batteries, for lithium secondary batteries which use the intercalation/deintercalation reactions of the lithium ions for the charge-discharge reactions; an electrode structure composed of the lithium-intercalated compound material; and a lithium secondary battery of high capacity and high charge-discharge efficiency.

It is another object of the present invention to provide methods for producing the lithium-intercalated compound material for the electrode and electrode structure for the above lithium secondary battery.

The inventors of the present invention have found that a lithium secondary battery has high capacity, high charge-discharge efficiency and long serviceability, when a metal oxide of porous structure provided with ordered pores and capable of intercalating or deintercalating the lithium ions at least by the electrochemical reactions is used as the electrode material (electrode active material).

DETAILED DESCRIPTION OF THE PREFERRED EMBODIMENTS

The first invention is a metal oxide of porous structure provided with ordered pores and capable of intercalating or deintercalating the lithium ions by the electrochemical reactions. The metal oxide of the present invention is preferably selected from the group consisting of transition metal oxides, lithium-transition metal oxides, tin oxide and lithium-tin oxides of porous structure, more preferably from the group consisting of transition metal oxides and lithium-transition metal oxides of porous structure. The ordered pores are preferably through-holes oriented substantially in one direction. The metal oxide of the present invention preferably has a specific surface area of 10 $m^2$/g or more, more preferably 100 $m^2$/g or more. Moreover, the metal oxide of the present invention is preferably of layered structure running along the ordered pores. The pore in the metal oxide has a diameter preferably in a range from 0.5 to 20 nm, more preferably from 1 to 10 nm. The ordered pores are preferably 0.5 to 20 nm apart from each other, more preferably 1 to 10 nm apart from each other.

The second invention is an electrode structure composed at least of the metal oxide of porous structure provided with ordered pores and capable of intercalating or deintercalating the lithium ions by the electrochemical reactions.

The third invention is a secondary battery which uses the electrode structure composed at least of the metal oxide of porous structure provided with ordered pores and capable of intercalating or deintercalating the lithium ions by the electrochemical reactions for the anode and/or cathode.

The present invention also provides a method for producing the metal oxide of porous structure provided with ordered pores and capable of intercalating or deintercalating the lithium ions by the electrochemical reactions, at least involving a step of preparing a mixed liquid of a template agent for configuring the pores, the agent showing interactions with the metallic compound as the starting material, solvent and ions; a method for producing the electrode structure composed at least of the metal oxide of porous structure provided with ordered pores; and a method for producing the secondary battery which uses the electrode structure composed at least of the metal oxide of ordered porous structure for at least one of the anode and cathode.

The above template agent shows interactions with the metallic ions, accelerates formation of the metal hydroxide or oxide of regulary layered structure with ordered pores, and is preferably liquid-crystalline.

The above production method preferably involves steps of forming the metal hydroxide by the chemical reactions with the above mixed liquid and of calcining the above metal hydroxide.

The secondary battery of the present invention, which uses the intercalation/deintercalation reactions by the red-ox reactions of the lithium ions for the charge-discharge reactions at the electrode, includes the "lithium-ion battery" which uses a carbon material for the anode.

The present invention allows to realize a lithium secondary battery of high capacity, high charge-discharge efficiency and long serviceability by using the powdery material, comprising as the major ingredient the metal oxide provided with ordered pores and capable of intercalating or deintercalating the lithium ions by the electrochemical reactions, as the active material that constitutes the electrode for the lithium secondary battery. The "active material" for the present invention is a material involved in the cyclic electrochemical reactions for charging and discharging the battery. In particular, it is a material intercalated or deintercalated with lithium, and capable of reversibly intercalating or deintercalating lithium by the electrochemical reactions for the lithium secondary battery. The metal oxide intercalating or deintercalating the lithium ions by the electrochemical reactions takes a porous structure with through-holes oriented substantially in one direction. This structure allows itself to absorb a larger quantity of the electrolyte solution, and thereby to accelerate movement of the ions occurring during the electrochemical reactions of the lithium ions and control strains resulting from volumetric expansion of the active material when lithium is intercalated. As a result, it is considered that the metal oxide allows the electrochemical reactions associated with charging and discharging to proceed efficiently, easily passes large quantities of current, increases battery capacity, and control strains resulting from volumetric expansion of the active material,
preventing damages of the electrode which would be otherwise caused by the cyclic charging and discharging reactions. The metal oxide of porous structure of the present invention absorbs larger quantities of the electrolyte solution, making it a good material for the electrode structure suitable for the battery with a gel electrolyte with solidified electrolyte solution.

The embodiments of the powdery material, electrode structure and secondary battery of the present invention are described below, by referring to the attached FIGS. 1 to 5.

Metal Oxide with Ordered Pores

Figure 1:
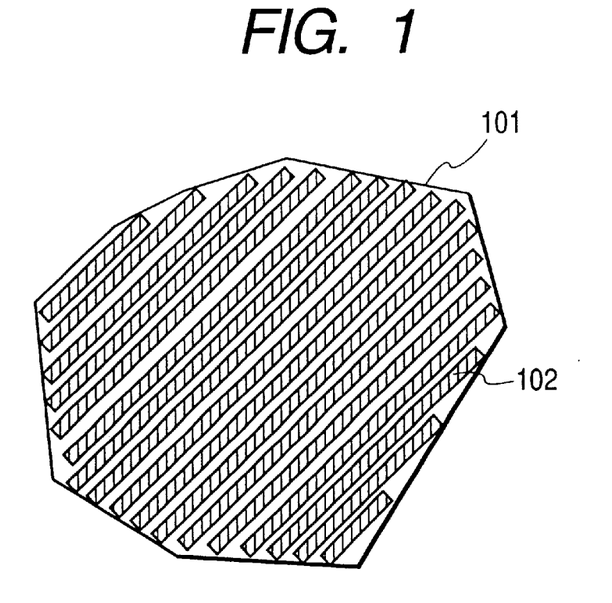
FIG. 1 is a model sectional view of the sectional structure of the ordered porous metal oxide of the present invention.

FIG. 1 shows a conceptual model of one grain of the porous metal oxide with ordered pores, intercalated or deintercalated with the lithium ions by the electrochemical reactions, where the metal oxide grain 101 has ordered pores 102. These pores are preferably through-holes oriented substantially in one direction. The metal oxide grains of the present invention preferably has a specific surface area of 10 $m^2/g$ or more, determined by the Brunauer-Emmet-Teller (BET) method by adsorption of nitrogen, more preferably 100 $m^2/g$ or more. The metal oxide 101 is preferably of layered structure running along the ordered pores 102.

The pore in the metal oxide has a diameter preferably in a range from 0.5 to 20 nm, more preferably from 1 to 10 nm. The regularly ordered pores are preferably 0.5 to 20 nm apart from each other, more preferably 1 to 10 nm apart from each other. When a lithium secondary battery is produced using the metal oxide of the present invention for the electrode and a liquid ionic conductor for the electrolyte solution, the metal oxide absorbs the electrolyte solution in a number of its pores to cause the smooth electrochemical intercalation and deintercalation reactions of the lithium ions during the battery charging and discharging steps. The metal oxide of the present invention also allows to easily produce the battery with immobilized electrolyte solution, in particular gel electrolyte battery, free of liquid leakage.

Preparation of Metal Oxide of Porous Structure with Regularly Ordered Pores

The method of the present invention for preparation of the metal oxide is characterized by the step of preparing the metal oxide and use of a template agent, showing interactions with the ions, for configuring the pores.

More concretely, the method for preparing the metal oxide involves decomposition of the starting material selected from the group consisting of metal alkoxides, metal salts including salts of organic acids, nitrates and carbonates, metal-acetylacetone complexes, metal naphthenate soaps, metal octylate soaps, and metal chelates. The representative examples of the organic acids for the metal salts include acetic acid, oxalic acid, citric acid and formic acid. The preferable starting materials for the metal oxide include transition metal compounds and tin compounds, the former being more preferable. The transition metals useful for the present invention include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au, of which Mn, Ni, Co, Cr, V, Fe, Ti, Mo, W and Nb are more preferable.

The preparation method of the present invention is characterized by steps of dissolving or dispersing the above starting material in a solvent together with a template agent for configuring the pores (e.g., a liquid-crystalline compound), hydrolysis or pyrolysis, and calcining as the final step to remove the above template agent by decomposition and to leave behind the metal oxide with regularly ordered pores. Addition of such a template agent brings about the effect of forming the hydroxide of layered structure by hydrolysis of the starting material with regularly ordered ions, and decomposing it by calcining into the metal oxide, to form the regularly ordered pores.

The solvents useful for the present invention to dissolve the starting material include alcohol, water, alkoxyalcohol, oxalic acid, formamide, and dimethyl formamide. It is preferable to add a small quantity of, e.g., tartaric acid, acetylacetone, hydrochloric acid, nitric acid, acetic acid, ethanolamine and ammonia to dissolve the starting material uniformly.

The hydroxide is calcined preferably at 250 to 900° C., more preferably 350 to 800° C.

The template agents useful for the present invention to configure the pores include a variety of low-molecular-weight or polymer liquid-crystalline compounds. The lyotropic liquid-crystalline compounds, which show liquid crystallinity when dissolved in a solvent, may be used for the present invention. These compounds are inexpensive, and preferable template agents for reducing production cost of the porous metal oxide of the present invention.
(Liquid-Crystalline Compounds)

The rod-shaped molecular structure which shows liquid-crystallinity is preferably the one selected from the group consisting of those having one or more cyclic groups to which different terminal groups are bound, and those having cyclic groups connected by a central group (bonding group) to which different terminal groups are bound. The cyclic groups include benzene ring (phenyl group), trans-cyclohexane ring (cyclohexyl group), 6-membered heterocyclic rings, and polynuclear groups. The central group (bonding group) is selected from the group consisting of, e.g., —CH=N—, —CO—O—, —N=NO—, trans —N=N—, trans —CH=CH—, —C—C—, —$C_6H_4$—, and trans —$C_6H_{10}$—. The terminal group is preferably the one selected from the group consisting of, e.g., those having the general chemical formula of $C_nH_{2n+1}$, $C_nH_{2n+1}O$— and CN—.

The planar liquid-crystalline compounds useful for the present invention include benzene-ring compounds, heterocyclic compounds and polynuclear compounds. The planar liquid-crystalline molecules are preferably ordered in columns.

The liquid-crystalline material for the template agent for configuring the pores comprises, or consists of, a liquid-crystalline compound of the above structure, and may be of low-molecular-weight or polymer liquid crystal. It may be a nematic, cholesteric, smectic, ferroelectric or discotic liquid crystal, of which a nematic crystal is more preferable.

The low-molecular-weight nematic liquid crystals useful for the present invention include N-(4-methoxybenzylidene-4'-n-butylaniline), N-(4-ethoxybenzylidene-p'-4-butylaniline), p-azoxyanisole, 4-n-pentyl-4'-cyanobiphenyl, 4-n-octyloxy-4'-cyanobiphenyl, and trans-4-heptyl(4-cyanophenyl)cyclohexane.

The low-molecular-weight cholesteric liquid crystals useful for the present invention include cholestryl nonanate, hexaalkanoyloxybenzene, tetraalkanoyloxy-p-benzoquinone, hexaalkoxytriphenylene, hexaalkanoyloxytriphenylene, hexaalkanoyloxytoluxene, hexaalkanoylrufigallol, 2,2',6,6'-tetraaryl-4,4'-bipyranylidene, 2,2',6,6'-tetraaryl-4,4'-bithiopyranylidene, and substituted benzoate of hexahydrotriphenylene.

The low-molecular-weight smectic liquid crystals useful for the present invention include butyloxybenzylidene-octylaniline and p-cyanobenzylidene-p'-n-octyloxyaniline.

The low-molecular-weight discotic liquid crystals useful for the present invention include triphenylene-hexa-n-dodecanonate.

The polymer liquid crystals useful for the present invention include a poly-γ-benzyl-L-glutamate, poly(4-cyanophenyl-4'-hexyloxy benzoatemethylsiloxane), poly(4-methoxyphenyl-4'-propyloxy benzoatemethylsiloxane), block copolymer of polystyrene-polyethylene oxide, hydroxypropyl cellulose, poly(p-phenyleneterephthalamide), poly[(ethyleneterephthalate)-1,4-benzoate], poly(4,4'-dimethylazoxybenzenedodecanedioyl), poly(oligoethyleneazoxybenzoate) and poly(p-benzamide).
(Lyotropic Liquid-crystalline Compounds)

The lyotropic liquid-crystalline compounds useful for the present invention include soaps, surfactants, lipids and amphipathic compounds. The surfactants useful for the present invention are preferably nonionic or cationic ones, including an ester of fatty acid, ester of polyalcohol and fatty acid, ester of oxyacid, ester of propylene glycol and fatty acid, ester of glycerine and fatty acid, ester of polyoxyethylene glycerine and fatty acid, ester of polyglycerine and fatty acid, ester of sorbitan and fatty acid, ester of polyoxyethylene sorbitan and fatty acid, ester of polyoxyethylene sorbit and fatty acid, condensed polyoxyethylene alkylphenyl formaldehyde, ester of polyethylene glycol and fatty acid, polyoxyethylene alkyl ether, polyoxyethylene polyoxypropylene alkyl ether, polyoxyethylene alkyl phenyl ether, acetic acid betaine type ampholytic surfactant, alkyl ammonium salt, and amideamine. More concretely, the compounds of long alkyl chain having a carbon number of 8 or more are preferable, including a nonionic surfactant (e.g., octaethylene glycol monododecyl ether and octaethylene glycol monohexadecyl ether), lecithin, cetyl trimethyl ammonium bromide, cetyl trimethyl ammonium tartrate, and octadecyl malonic acid. These lyotropic liquid-crystalline compounds are less expensive than the low-molecular-weight or polymer liquid crystals, and are more preferable starting materials for the metal oxide of the present invention, provided with regularly ordered pores for intercalating or deintercalating the lithium ion by the electrochemical reactions.

Electrode Structure

Figure 2:
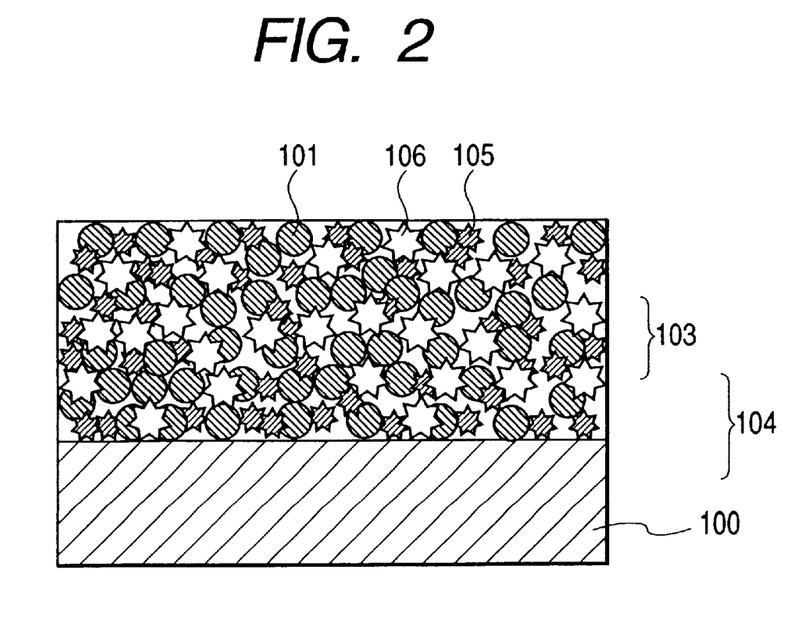
FIG. 2 is a model sectional view of the sectional structure of the electrode structure of the present invention.

FIG. 2 shows a conceptual model of the sectional structure of the electrode structure 104, composed of the metal oxide 101 provided with ordered pores and capable of intercalating or deintercalating the lithium ions by the electrochemical reactions. It is composed of a collector 100 which supports an electrode material layer (active material layer) 103, formed by applying the powdered metal oxide 101 (powdery material taking the form of element shown in FIG. 1), auxiliary electroconductive material 105 and binder 106.

One example of the method for producing the electrode structure 104 is described below.

(1) A mixture of the powder 101, produced by grinding the metal oxide of the present invention, powdered binder 105 and powdered auxiliary electroconductive material 106 is mixed with a solvent to form a paste of adjusted viscosity.

(2) The paste is spread over the collector 100, to form the electrode structure 104 comprising the electrode material layer 103. It may be roll-pressed, as required, to adjust its thickness. The collector 100 may be coated with the electrode material layers (active material layer) 103 on both sides to form some types of the battery.

The collector 100 may be coated by coater spreading or screen printing. The auxiliary electroconductive materials 105 useful for the electrode structure 104 include amorphous carbon (carbon black) such as acetylene black, graphite, and metals inert in the battery reactions. It is preferably powdery or fibrous. The binders 106 useful for the electrode structure 104 include a polyolefin, e.g., polyethylene and polypropylene; fluorine resin, e.g., polyvinylidene fluoride and tetrafluoroethylene polymer; cellulosic material, e.g., carboxymethyl cellulose; and polyvinyl alcohol, polyacrylonitrile and polymethyl methacrylate.

The collector 100 is responsible for efficiently supplying current to be consumed by the electrode reactions during the charging step and collecting current generated during the discharging step. Therefore, the material for the collector 100 for the electrode structure 104 is preferably high in conductivity and inert in the battery reactions. It is necessary, when a material becoming soluble in the battery reaction system is to be used, to coat it with an insoluble material. The preferable materials for the collector 100 include nickel, stainless steel, titanium, aluminum, copper, platinum, palladium, gold, zinc, various alloys, and composite of two or more materials above described. The collector 100 may take a form of plate, foil, mesh, sponge, fiber, punched metal and expanded metal.

Figure 3:
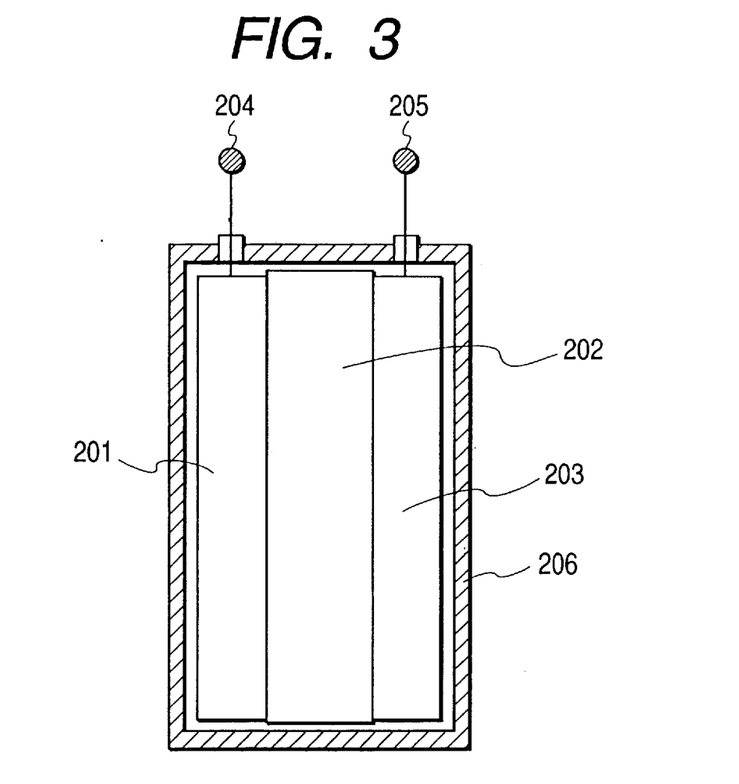
FIG. 3 is a model sectional view of the secondary battery of the present invention.

FIG. 3 shows a conceptual sectional model of the secondary battery (lithium secondary battery) of the present invention. It comprises the anode 201 and cathode 203 facing each other via an ion conductor (e.g., electrolyte-containing separator or gel electrolyte), encased in a housing (case) 206, where the cathode 203 and anode 201 are connected to the cathodic terminal 205 and anodic terminal 204, respectively.

The secondary battery of the present invention, shown in FIG. 3, uses the electrode structure 104 shown in FIG. 2 composed of the metal oxide of structure shown in FIG. 1 for the cathode 203 and/or anode 201 (different types of metal oxides should be used when each of these electrodes is composed of the metal oxide). When the electrode structure of the present invention is to be used both for the anode 201 and cathode 203, it is necessary to adequately select metal oxide material for each electrode material layer for the electrode structure in such a way to create an electromotive force, i.e., potential difference between these electrodes. The potential difference between these electrodes is preferably 1.2 V or more, more preferably 3 V or more. At least one of the cathode and anode should contain elementary lithium.

(Anode 201)

When the electrode structure composed of the metal oxide of the present invention, provided with regularly ordered pores and capable of intercalating or deintercalating the lithium ions by the electrochemical reactions, is used only for the cathode 203 for the lithium secondary battery, the anode active materials (electrode materials) useful for the anode 201 (counter electrode) to serve as the host for the lithium ions for the lithium secondary battery include a carbon material (including graphite), metallic lithium, lithium alloy, metallic material forming an alloy with lithium by the electrochemical reactions, and transition metal oxide, transition metal sulfide, transition metal nitride, lithium-transition metal oxide, lithium-transition metal sulfide and lithium-transition metal nitride which create an electromotive force with the cathode active material. The preferable transition metal elements for the above transition metal oxides include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au. When the anode active material is powdery, the anode is formed by using a binder or firing to form the anode active material on the collector. When the anode active material is low in conductivity, it may be necessary to use an adequate auxiliary electroconductive material, as is the case with forming the electrode material layer (active material layer) for the electrode structure. The collector, auxiliary electroconductive material and binder may be similar to those for the electrode structure 104 of the present invention.

(Cathode 203)

When the electrode structure composed of the metal oxide of the present invention, provided with regularly ordered pores and capable of intercalating or deintercalating the lithium ions by the electrochemical reactions, is used only for the anode 201 for the lithium secondary battery, the cathode active materials (electrode materials) useful for the cathode 203 (counter electrode) to serve as the host for the lithium ions for the lithium secondary battery include a carbon material (including graphite), metallic lithium, lithium alloy, metallic material forming an alloy with lithium by the electrochemical reactions, and transition metal oxide, transition metal sulfide, transition metal nitride, lithium-transition metal oxide, lithium-transition metal sulfide and lithium-transition metal nitride which create an electromotive force with the cathode active material. The transition metal elements for the above transition metal oxides include metal elements with d-shell or f-shell, and Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag and Au are preferably used. When the cathode active material is powdery, the cathode is formed by using a binder or calcining to form the cathode active material on the collector. When the cathode active material is low in conductivity, it may be necessary to use an adequate auxiliary electroconductive material, as is the case with forming the electrode material layer (active material layer) for the electrode structure. The collector, auxiliary electroconductive material and binder may be similar to those for the electrode structure 104 of the present invention.

(Ion Conductor 202)

The ion conductor 202 for the lithium secondary battery of the present invention may be of lithium ion conductor, e.g., separator holding an electrolyte solution (supporting electrolyte solution prepared by dissolving a supporting electrolyte in a solvent), solid electrolyte or solidified electrolyte prepared by gelling the electrolyte with a polymer gel.

The ion conductor for the secondary battery of the present invention preferably should have a conductivity of $1 \times 10^{-3}$ S/cm or more at 25° C., more preferably $5 \times 10^3$ S/cm.

The above-mentioned separator also serves to prevent short-circuit between the anode 201 and cathode 203 within the secondary battery, shown in FIG. 3. It may serve to hold the electrolyte solution (when a liquid material is used as the electrolyte).

It is necessary for the separator to have pores through which the lithium ions can move, and be insoluble in, and resistant to, the electrolyte solution. Therefore, the materials suitable for the separator include glass, polyolefin (e.g., polypropylene and polyethylene) and fluorine resin in the form of non-woven fabric or of microporous structure. A metal oxide film with micropores and resin film composited with a metal oxide can be also used. In particular, a metal oxide film of layered structure, through which dendrite is difficult to pass, can efficiently prevent short-circuit. Safety can be further improved when a flame-retardant material (e.g., fluorine resin film) or non-combustible material (e.g., glass and metal oxide film) is used.

(Electrolyte)

An electrolyte can be used for the present invention by the following three methods:

(1) it is used directly,
(2) it is used, after being dissolved in a solvent, and
(3) it is used, after being solidified by the aid of a gelation template agent, such as polymer, added to the solution.

It is generally used after being dissolved in a solvent, the resultant electrolytic solution being held by a porous separator.

The electrolytes useful for these present invention include an acid (e.g., $H_2SO_4$, HCl or $HNO_3$), and salt of lithium ion ($Li^+$) and Lewis acid ion, e.g., $BF_4^-$, $PF_6^-$, $AsF_6^-$, $ClO_4^-$, $CF_3SO_3^-$ or $BPh_4^-$ (Ph: phenyl group) and a mixture thereof. A salt of cation, e.g., sodium, potassium or tetraalkyl ammonium ion and Lewis acid ion may be also used. It is preferable that the above salt is sufficiently dehydrated and deoxygenated beforehand by, e.g., heating under a vacuum.

The solvents useful for dissolving the electrolyte Ad -include acetonitrile, benzonitrile, propylene carbonate, ethylene carbonate, dimethyl carbonate, diethyl carbonate, dimethyl formamide, tetrahydrofuran, nitrobenzene, dichloroethane, diethoxy ethane, 1,2-dimethoxy ethane, chlorobenzene, γ-butyrolactone, dioxolane, sulfolane, nitromethane, dimethyl sulfide, dimethyl suloxide, methyl formate, 3-methyl-2-oxazolidinone, 2-methyltetrahydrofuran, 3-propylsydnone, sulfur dioxide, phosphoryl chloride, thionyl chloride, sulfuryl chloride, and a mixture thereof.

The above solvents may be dehydrated by activated alumina, molecular sieve, phosphorus pentaoxide or calcium chloride. Some may be distilled in the presence of an alkaline metal in an inert atmosphere, for impurity removal and dehydration. The electrolyte solution is preferably gelled, to prevent leakage of the solution. The gelation template agent useful for the above purpose is a polymer which swells by absorbing the solvent of the solution. Polyethylene oxide, polyvinyl alcohol, polyacrylamide and polymers of various vinyl monomers are some of the examples of such polymers.

(Battery Shape and Structure)

The secondary battery of the present invention may be shaped into a flat plate, cylinder, rectangular parallelepiped or sheet. It may be of monolayered, multilayered or spiral structure. A spiral cylindrical battery has advantages of large electrode area and passing large quantities of current during the charging and discharging steps by winding the anode and cathode with a separator in-between. The rectangular parallelepiped and sheet shaped batteries have an advantage of efficiently utilizing the space by encasing a plurality of battery units therein.

Figure 4:
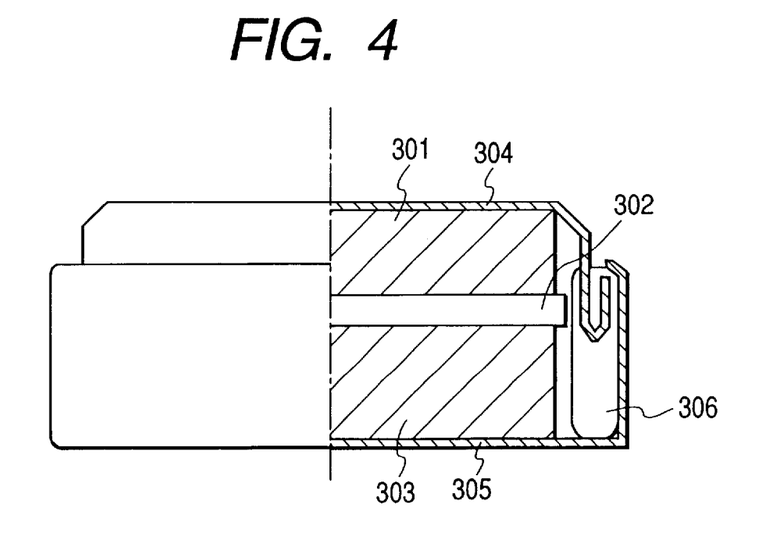
FIG. 4 is a sectional view of the monolayer, flat battery.
Figure 5:
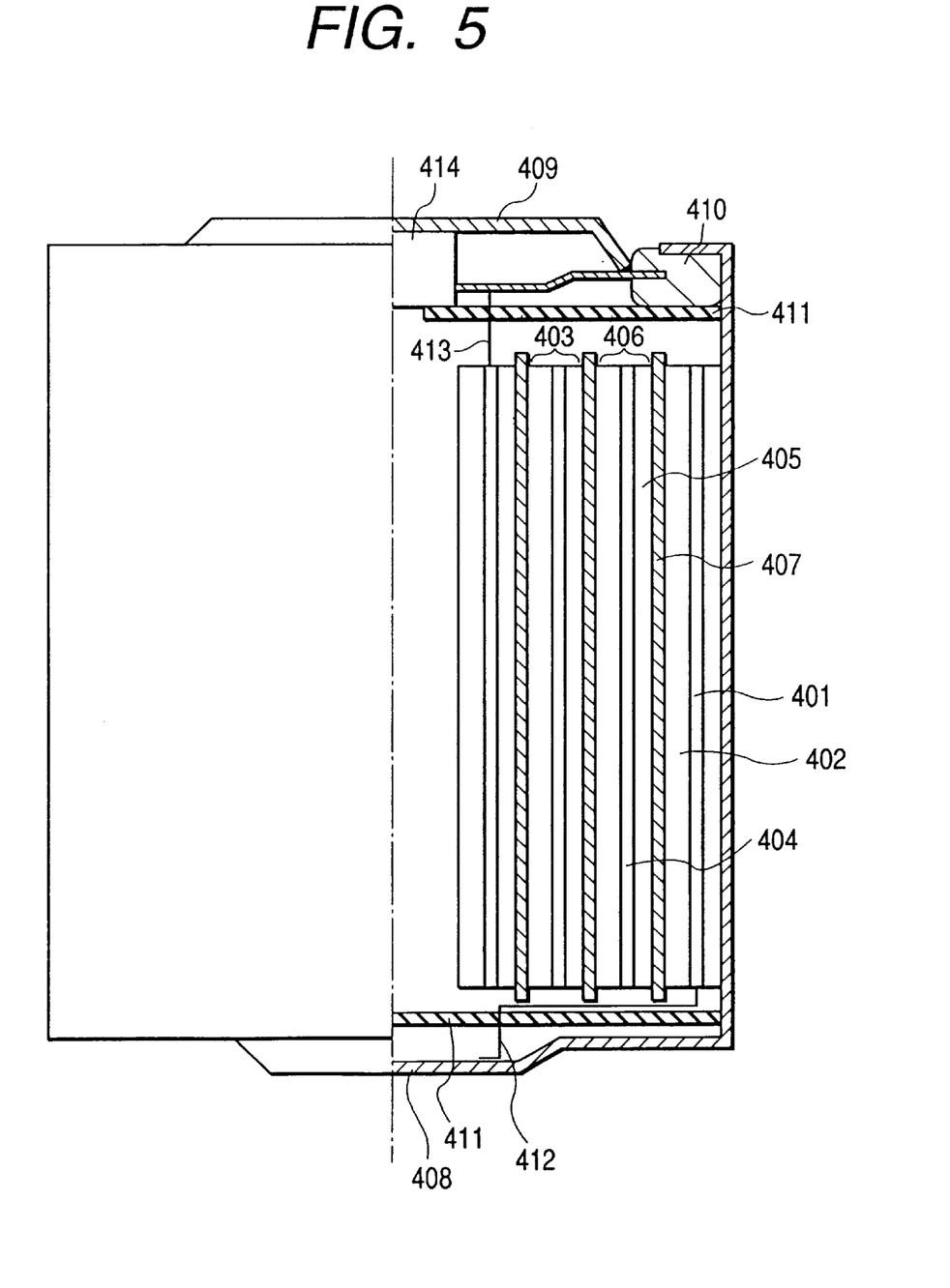
FIG. 5 is an outline of the sectional view of the spiral wound type cylindrical battery structure.

The battery shapes and structures are described more concretely by referring to FIGS. 4 and 5, which are sectional views of the monolayered flat shape (coin shape) battery and spiral cylindrical battery, respectively. These lithium batteries are composed of basically the same devices as is the battery shown in FIG. 3, e.g., anode, cathode, ion conductor (electrolyte and separator), battery housing and output terminal.

In these figures, 301 and 403 are anodes, 303 and 406 are cathodes, 304 and 408 are terminals for the anodes (anode caps or cases), 305 and 409 are terminals for the cathodes (cathode caps or cases), 302 and 407 are ion conductors, 306 and 410 are gaskets, 401 is a collector for the anode, 404 is a collector for the cathode, 411 is an electroinsulating plate, 412 is a lead for the anode, 413 is a lead for the cathode, and 414 is a safety valve.

In the flat shape (coin shape) secondary battery shown in FIG. 4, the cathode 303 containing the cathode material layer and anode 301 provided with the anode material layer are placed one on another with the ion conductor 302 (separator holding the electrolyte solution) in-between. This laminated assembly is put in the cathode case 305, serving as the terminal for the cathode, from the cathode side, and the anode is coated with the anode cap 304 serving as the terminal for the anode. The gasket 306 is arranged in the other section within the cathode case.

In the spiral cylindrical secondary battery shown in FIG. 5, the cathode 406 having the cathode (material) layer 405 on the collector 404 for the cathode and the anode 403 having the anode (material) layer 402 on the collector 401 for the anode face each other at least with the ion conductor 407 (separator holding the electrolyte solution) in-between, and wound many times to form the laminated assembly of cylindrical structure, encased in the anode case 408 serving as the terminal for the anode. The cathode cap 409 serving as the terminal for the cathode is provided in the anode case 408 at the opening side, and the gasket 410 is arranged in the other section within the anode case. The laminated electrode assembly of cylindrical structure is apart from the cathode cap side via the electroinsulating plate 411. The cathode 406 is connected to the cathode cap 409 by the lead 413 for the cathode. The anode 403 is connected to the anode case 408 by the lead 412 for the anode. The safety valve 414 is provided on the cathode cap side, to adjust pressure within the battery.

As described earlier, the layer of the powdery material of the present invention is used for the active material layer for the anode 301 and the active material layer 402 for the anode 403.

One example of the procedure for assembling the batteries shown in FIGS. 4 and 5 is described below:

(1) The anode 301 or 403 and formed cathode 303 or 406 with the separator 302 or 407 in-between are assembled in the cathode or anode case 305 or 408.
(2) The anode or cathode cap 304 or 409 is assembled with the gasket 306 or 410, after the electrolyte is injected.
(3) The battery is completed when the assembly prepared in the above step (2) is caulked.

It is preferable to prepare the materials for the lithium battery and assemble the battery in a sufficiently dried air or dried inert gas atmosphere.

Next, the members for the above secondary battery are described below:

(Electroinsulating Packing)

The materials useful for the gaskets 306 and 410 include fluorine resin, polyamide resin, polysulfone resin and various types of rubber. The openings in the battery can be sealed by a glass tube, adhesive, welding and soldering, in addition to caulking using the electroinsulating packing, as shown in FIGS. 4 and 5. The materials useful for the electroinsulating plate shown in FIG. 4 include various types of organic resin and ceramics.

(Outer Case)

The outer case for the battery is composed of the cathode or anode case 305 or 408, and anode or cathode cap 304 or 409. The preferable material for the outer case is stainless steel, in particular titanium clad, copper clad and nickel-plated stainless steel being widely used.

The cathode case 305 shown in FIG. 4 and anode case 408 shown in FIG. 5 also serve as the battery housing (case), and are preferably made of the above stainless steel. When the cathode or anode case is not serving as the battery housing, metals (e.g., iron and zinc), plastics (e.g., polypropylene)

and composites of plastics reinforced with metallic or glass fibers may be used, in addition to the above stainless steel, for the battery case.

(Safety Valve)

A safety valve is provided in the lithium secondary battery as a measure to prevent excessive accumulation of pressure within the battery. Rubber, spring, metallic ball or rupture foil can be used for the safety valve.

EXAMPLES

The present invention is described more concretely by EXAMPLES, which by no means limit the present invention.

Preparation of Metal Oxide

Example 1

The transition metal oxide of the present invention, provided with ordered pores, is prepared by the following steps:
(1) Octaethyleneglycol monohexadecyl ether as the surfactant was mixed with the same quantity (weight basis) of deionized water.
(2) An ethanol solution of diethoxy manganese [$Mn(OC_2H_5)_2$], twice as much as water (weight basis), was added to the mixed solution prepared by the above step (1) dropwise. The mixture was allowed to stand for 10 h, and heated at 80° C. to form a solid, which was dried at 100° C. under a vacuum.
(3) The dried mixture was calcined at 400° C. in a flow of air, to form the manganese oxide.

Example 2

The transition metal oxide of the present invention, provided with ordered pores, is prepared by the following steps:
(1) Octaethyleneglycol monohexadecyl ether as the surfactant was mixed with the same quantity (weight basis) of deionized water.
(2) An ethanol solution of diethoxy manganese [$Mn(OC_2H_5)_2$], twice as much as water (weight basis), was added to the mixed solution prepared by the above step (1) dropwise. The mixture was allowed to stand for 10 h, and heated at 80° C. to form a solid, which was dried at 100° C. under a vacuum.
(3) The manganese-containing solid prepared by the above step (2) was mixed with an aqueous solution of lithium citrate in such a way to form the mixture containing manganese and lithium in an atomic ratio of 2:1. The mixture was dried, and calcined at 650° C. in a flow of air, to form the lithium-manganese compound oxide.

Example 3

The transition metal oxide of the present invention, provided with ordered pores, is prepared by the following steps:
(1) A mixture of octaethyleneglycol monohexadecyl ether as the surfactant, manganese acetate and deionized water (weight ratio: 1:0.4:1) was prepared.
(2) An aqueous solution of tetramethyl ammonium hydroxide, twice as much as manganese acetate (molar basis), was added to the mixed solution prepared by the above step (1) dropwise, to form precipitates. The mixture was dried at 100° C. under a vacuum. (3) The dried mixture was calcined at 400° C. in a flow of air, to form the manganese oxide.

Example 4

The transition metal oxide of the present invention, provided with ordered pores, is prepared by the following steps:
(1) Lauryl ether lithium acetate as the surfactant was dissolved in a mixture of manganese acetate and deionizeed water (weight ratio: 0.4:1), to have a surfactant/manganese acetate molar ratio of 2:1.
(2) An aqueous solution of lithium hydroxide, twice as much as manganese acetate (molar basis), was added to the mixed solution prepared by the above step (1) dropwise, to form precipitates. The mixture was dried at 100° C. under a vacuum.
(3) The dried mixture was calcined at 650° C. in a flow of air, to form the lithium-manganese compound oxide.

The lauryl ether lithium acetate was prepared by ion-exchanging lauryl ether sodium acetate. Lauryl ether sodium acetate was dissolved in N-butyl alcohol dissolving lithium chloride. The precipitates of sodium chloride, formed by the ion-exchanging reactions, were removed, and N-butyl alcohol in the N-butyl alcohol solution was removed by evaporation under a vacuum, to form lauryl ether lithium acetate.

Example 5

The transition metal oxide of the present invention, provided with ordered pores, is prepared by the following steps:
(1) A mixture of octaethyleneglycol monododecyl ether as the surfactant, nickel (II) acetate and deionized water (weight ratio: 1:0.15:1) was prepared.
(2) An ethanol solution of sodium hydroxide, as much as nickel acetate (molar basis), was added to the mixed solution prepared by the above step (1) dropwise, to form precipitates. The mixture was washed with water and dried at 100° C. under a vacuum.
(3) The nickel-containing solid prepared by the above step (2) was mixed with an aqueous solution of lithium citrate in such a way to form the mixture containing nickel and lithium in an atomic ratio of 1:1. The mixture was dried, and calcined at 650° C. in a flow of air, to form the lithium-nickel compound oxide.

Example 6

The transition metal oxide of the present invention, provided with ordered pores, is prepared by the following steps:
(1) A mixture of octaethyleneglycol monohexadecyl ether as the surfactant, diethylamine and deionized water (weight ratio: 1:0.15:1) was prepared.
(2) An aqueous solution of nickel nitrate, 0.5 times as much as diethylamine (molar basis), was added to the mixed solution prepared by the above step (1) dropwise, to form precipitates. The mixture was washed with water and dried at 100° C. under a vacuum.
(3) The nickel-containing solid prepared by the above step (2) was mixed with an aqueous solution of lithium citrate in such a way to form the mixture containing nickel and lithium in an atomic ratio of 1:1. The mixture was dried, and calcined at 650° C. in a flow of air, to form the lithium-nickel compound oxide.

Example 7

The transition metal oxide of the present invention, provided with ordered pores, is prepared by the following steps:
(1) Lauryl ether lithium acetate as the surfactant was dissolved in a mixture of nickel acetate and deionized water (weight ratio: 0.4:1), to have a surfactant/nickel acetate molar ratio of 1:1.
(2) An aqueous solution of lithium hydroxide, as much as nickel acetate (molar basis), was added to the mixed solution prepared by the above step (1) dropwise, to form precipitates. The mixture was dried at 100° C. under a vacuum.
(3) The dried mixture was calcined at 650° C. in a flow of air, to form the lithium-nickel compound oxide.

Example 8

The transition metal oxide of the present invention, provided with regularly ordered pores, is prepared by the following steps:
(1) A mixture of N-(4-methoxybenzylidene-4'-n-butylaniline) as the low-molecular weight liquid-crystalline compound, nickel nitrate and ethyl alcohol (weight ratio: 2:2:10) was prepared.
(2) An aqueous solution of sodium hydroxide, as much as nickel nitrate (molar basis), was added to the mixed solution prepared by the above step (1) dropwise, to form precipitates. The mixture was washed with water and dried at 100° C. under a vacuum.
(3) The nickel-containing solid prepared by the above step (2) was mixed with an aqueous solution of lithium citrate in such a way to form the mixture containing nickel and lithium in an atomic ratio of 1:1. The mixture was dried, and calcined at 650° C. in a flow of air, to form the lithium-nickel compound oxide.

Example 9

The transition metal oxide of the present invention, provided with ordered pores, is prepared by the following steps:
(1) Lithium hydroxide was dissolved in a 30 wt. % aqueous solution of pentaoxyethylene stearylamine to have a 1 mol/L aqueous solution of lithium hydroxide, in which vanadium (V) oxide, as much as lithium hydroxide (molar basis), was dissolved.
(2) The solution prepared by the above step (1) was heated at 80° C. for the reactions of the components to form a solid. It was dried, and further dried at 100° C. under a vacuum.
(3) The solid prepared by the above step (2) was calcined at 350° C. in a flow of air, to form the lithium-vanadium compound oxide.

Example 10

The transition metal oxide of the present invention, provided with ordered pores, is prepared by the following steps:
(1) Lithium hydroxide was dissolved in a 30 wt. % aqueous solution of pentaoxyethylene stearylamine to have a 1 mol/L aqueous solution of lithium hydroxide, in which vanadium (V) oxide and nickel nitrate, each 0.5 times as much as lithium hydroxide (molar basis), were dissolved.
(2) The solution prepared by the above step (1) was heated at 80° C. for the reactions of the components to form a solid. It was dried, and further dried at 100° C. under a vacuum.
(3) The solid prepared by the above step (2) was calcined at 350° C. in a flow of air, to form the lithium-nickel-vanadium compound oxide.

Example 11

The transition metal oxide of the present invention, provided with regularly ordered pores, is prepared by the following steps:
(1) A 1 mol/L aqueous solution of lithium hydroxide was prepared, in which vanadium (V) oxide, 0.5 times as much as lithium hydroxide (molar basis), was dissolved.
(2) A mixture of octaethyleneglycol monohexadecyl ether as the surfactant, deionized water, ethyl alcohol and manganese nitrate (weight ratio: 5:4:1:2) was prepared.
(3) The solution prepared by the above step (1) was added to the solution prepared by the above step (2) dropwise, to have the solution containing manganese and the same quantity of lithium. The solution thus prepared was heated at 80° C. for the reactions of the components to form a solid. It was dried, and further dried at 100° C. under a vacuum.
(4) The solid prepared by the above step (3) was calcined at 350° C. in a flow of air, to form the lithium-manganese-vanadium compound oxide.

Example 12

The transition metal oxide of the present invention, provided with ordered pores, is prepared by the following steps:
(1) Lithium hydroxide was dissolved in a 30 wt. % aqueous solution of pentaoxyethylene stearylamine to have a 1 mol/L aqueous solution of lithium hydroxide, in which vanadium (V) oxide and zinc oxide, 0.5 times as much as lithium hydroxide for the former and as much as lithium hydroxide for the latter (molar basis), were dissolved.
(2) The solution prepared by the above step (1) was heated at 80° C. for the reactions of the components to form a solid. It was dried, and further dried at 100° C. under a vacuum.
(3) The solid prepared by the above step (2) was calcined at 350° C. in a flow of air, to form the lithium-zinc-vanadium compound oxide.

Comparative Example 1

Electrolytic manganese (IV) oxide was thermally treating at 350° C., to prepare manganese oxide.

Comparative Example 2

A mixture of electrolytic manganese (IV) oxide and lithium carbonate (molar ratio: 1:0.4) was thermally treated at 800° C., to prepare the lithium-manganese oxide.

Comparative Example 3

An equimolar mixture of lithium nitrate and nickel carbonate was thermally treated at 750° C. in a flow of air, to prepare the lithium-nickel oxide.

Comparative Example 4

(1) A 1 mol/L aqueous solution of lithium hydroxide was prepared, and vanadium (V) oxide, as much as lithium hydroxide (molar basis), was dissolved in the aqueous solution. The solution thus prepared was heated at 80° C. for the reactions of the components to form a solid. It was dried, and further dried at 100° C. under a vacuum.
(2) The solid prepared by the above step (1) was calcined at 350° C. in a flow of air, to form the lithium-vanadium compound oxide.

Comparative Example 5

(1) A mixture of lithium and nickel hydroxides (molar ratio: 2:1) was calcined at 700° C. in a flow of air, to prepare the mixture of lithium and nickel oxides.
(2) The mixed oxide prepared by the above step (1) was mixed with vanadium (III) oxide (molar ratio: 2:1), and the mixture was calcined at 500° C. in a flow of air and further calcined at 800° C., to form the lithium-nickel-vanadium compound oxide.

Comparative Example 6

A mixture of lithium carbonate, electrolytic manganese (IV) oxide and vanadium (V) oxide (molar ratio: 12:1:2) was calcined at 700° C. in a flow of air and quenched, to form the lithium-manganese-vanadium compound oxide.

Comparative Example 7

(1) A mixture of lithium hydroxide and zinc hydroxides (molar ratio: 2:1) was calcined at 700° C. in a flow of air, to prepare the mixture of lithium and zinc oxides. (2) The mixed oxide prepared by the above step (1) was mixed with vanadium (III) oxide (molar ratio: 2:1), and the mixture was calcined at 500° C. in a flow of air and further calcined at 800° C., to form the lithium-zinc-vanadium compound oxide.

Observations of Pores

It is confirmed by the electron microscopic analysis of the metal oxides, prepared by EXAMPLES 1 to 12 and COMPARATIVE EXAMPLES 1 to 7, that each of those oxides prepared by EXAMPLES 1 to 12 has ordered pores, whereas none of those oxides prepared by COMPARATIVE EXAMPLES 1 to 7 have such ordered pores. It is also confirmed that the pores of the metal oxides prepared by EXAMPLES 1 to 12 have a diameter in a range from 0.5 to 20 nm and are 0.5 to 20 nm apart from each other.

Measurement of Specific Surface Area

Specific surface area was measured by BET method for each of the metal oxides, prepared by EXAMPLES 1 to 12 and COMPARATIVE EXAMPLES 1 to 7. It is found that the metal oxide prepared by EXAMPLE has a higher specific surface area (10 m$^2$/g or more) than the oxide of the same type by COMPARATIVE EXAMPLE under different conditions.

Capacity of Absorbing Liquid

Capacity of absorbing liquid (g/g) was measured and evaluated for each of the metal oxides, prepared by EXAMPLES 1 to 12 and COMPARATIVE EXAMPLES 1 to 7. The liquid (electrolyte solution) was a 1 M (mol/L) solution of a lithium salt of tetrafluoroboric acid as the supporting electrolyte dissolved in a mixed solvent of ethylene carbonate (EC) and dimethyl carbonate (DMC) (weight ratio: 1:1). It is found that the metal oxide prepared by EXAMPLE absorbs 1.2 to 1.5 times more liquid than the oxide of the same type prepared by COMPARATIVE EXAMPLE.

Thus, it is found that the method of the present invention gives the metal oxide having ordered pores, large specific surface area and absorbs a large quantity of the electrolyte solution, when it is used for a lithium secondary battery electrode, as confirmed by the electron microscopic analysis, and measurements of specific surface area and capacity of absorbing liquid.

The specific oxides were prepared as electrode materials (active materials) by EXAMPLES 1 to 12, which by no means limit the present invention. The method of the present invention is also applicable to other transition metal oxides, e.g., lithium-cobalt and lithium-iron oxides.

Preparation of Electrode Structure

The electrode structure 104, having the sectional structure shown in FIG. 2, was prepared. It was composed of the electrode material layer 103, composed of the metal oxide 101 prepared by one of EXAMPLES 1 to 12 and COMPARATIVE EXAMPLES 1 to 7, on the collector 100.

Example 13

(1) The manganese oxide prepared by EXAMPLE 1 was ground to an average diameter of around 10 μm.

(2) The manganese oxide powder, prepared by the above step (1), was mixed with carbon powder of acetylene black and polyvinylidene fluoride powder (weight ratio: 90:5:5). N-methyl-2-pyrrolidone was added to the mixture, to prepare a paste.

(3) The paste prepared by the above step (2) was applied to a collector of 20 μm thick aluminum foil and dried. The coated collector was then roll-pressed to adjust thickness of the electrode material layer at 90 μm, and dried at 150° C. under a vacuum, to form the electrode structure.

Example 14

The same procedure as used for EXAMPLE 13 was repeated, except that the manganese oxide prepared by EXAMPLE 1 was replaced by the lithium-manganese compound oxide prepared by EXAMPLE 2, to form the electrode structure.

Example 15

The same procedure as used for EXAMPLE 13 was repeated, except that the manganese oxide prepared by EXAMPLE 1 was replaced by the manganese oxide prepared by EXAMPLE 3, to form the electrode structure.

Example 16

The same procedure as used for EXAMPLE 13 was repeated, except that the manganese oxide prepared by EXAMPLE 1 was replaced by the lithium-manganese compound oxide prepared by EXAMPLE 4, to form the electrode structure.

Example 17

The same procedure as used for EXAMPLE 13 was repeated, except that the manganese oxide prepared by EXAMPLE 1 was replaced by the lithium-nickel compound oxide prepared by EXAMPLE 5, to form the electrode structure.

Example 18

The same procedure as used for EXAMPLE 13 was repeated, except that the manganese oxide prepared by EXAMPLE 1 was replaced by the lithium-nickel compound oxide prepared by EXAMPLE 6, to form the electrode structure.

Example 19

The same procedure as used for EXAMPLE 13 was repeated, except that the manganese oxide prepared by EXAMPLE 1 was replaced by the lithium-nickel compound oxide prepared by EXAMPLE 7, to form the electrode structure.

Example 20

The same procedure as used for EXAMPLE 13 was repeated, except that the manganese oxide prepared by EXAMPLE 1 was replaced by the lithium-nickel compound oxide prepared by EXAMPLE 8, to form the electrode structure.

Example 21

The same procedure as used for EXAMPLE 13 was repeated, except that the manganese oxide prepared by EXAMPLE 1 was replaced by the lithium-vanadium compound oxide prepared by EXAMPLE 9, to form the electrode structure.

Example 22

The same procedure as used for EXAMPLE 13 was repeated, except that the manganese oxide prepared by EXAMPLE 1 was replaced by the lithium-nickel-vanadium compound oxide prepared by EXAMPLE 10, to form the electrode structure.

Example 23

The same procedure as used for EXAMPLE 13 was repeated, except that the manganese oxide prepared by EXAMPLE 1 was replaced by the lithium-manganese-vanadium compound oxide prepared by EXAMPLE 11, to form the electrode structure.

Example 24

The same procedure as used for EXAMPLE 13 was repeated, except that the manganese oxide prepared by EXAMPLE 1 was replaced by the lithium-zinc-vanadium compound oxide prepared by EXAMPLE 12, to form the electrode structure.

Comparative Example 8

The same procedure as used for EXAMPLE 13 was repeated, except that the manganese oxide prepared by EXAMPLE 1 was replaced by the manganese oxide prepared by COMPARATIVE EXAMPLE 1, to form the electrode structure.

Comparative Example 9

The same procedure as used for EXAMPLE 13 was repeated, except that the manganese oxide prepared by EXAMPLE 1 was replaced by the lithium-manganese oxide prepared by COMPARATIVE EXAMPLE 2, to form the electrode structure.

Comparative Example 10

The same procedure as used for EXAMPLE 13 was repeated, except that the manganese oxide prepared by EXAMPLE 1 was replaced by the lithium-nickel oxide prepared by COMPARATIVE EXAMPLE 3, to form the electrode structure.

Comparative Example 11

The same procedure as used for EXAMPLE 13 was repeated, except that the manganese oxide prepared by EXAMPLE 1 was replaced by the lithium-vanadium compound oxide prepared by COMPARATIVE EXAMPLE 4, to form the electrode structure.

Comparative Example 12

The same procedure as used for EXAMPLE 13 was repeated, except that the manganese oxide prepared by EXAMPLE 1 was replaced by the lithium-nickel-vanadium compound oxide prepared by COMPARATIVE EXAMPLE 5, to form the electrode structure.

Comparative Example 13

The same procedure as used for EXAMPLE 13 was repeated, except that the manganese oxide prepared by EXAMPLE 1 was replaced by the lithium-manganese-vanadium compound oxide prepared by COMPARATIVE EXAMPLE 6, to form the electrode structure.

Comparative Example 14

The same procedure as used for EXAMPLE 13 was repeated, except that the manganese oxide prepared by EXAMPLE 1 was replaced by the lithium-zinc-vanadium compound oxide prepared by COMPARATIVE EXAMPLE 7, to form the electrode structure.

Electrochemical Intercalation and Deintercalation of Lithium Ion

The electrochemical intercalation and deintercalation of lithium ions were observed for the system composed of the electrode structure selected from those prepared by EXAMPLES 13 to 24 and COMPARATIVE EXAMPLES 8 to 14 as the working electrode, expanded nickel metal pressed to a lithium metal foil as the counter electrode and a lithium metal foil wound around a nickel wire as the reference electrode, put in a beaker filled with the electrolyte solution, which was a 1 M (mol/L) solution of a lithium salt of tetrafluoroboric acid as the supporting electrolyte dissolved in a mixed solvent of ethylene carbonate (EC) and dimethyl carbonate (DMC) (weight ratio: 1:1). The tests were conducted in an argon gas atmosphere. It is confirmed that the electrochemical intercalation and deintercalation take place in the above system.

Preparation of Secondary Battery

A lithium secondary battery was prepared using the electrode structure selected from those prepared by EXAMPLES 13 to 24 and COMPARATIVE EXAMPLES 8 to 14 for at least one of the cathode and anode. The battery was designed in such a way that the anode was intercalated with a larger quantity of lithium than the cathode and the battery capacity depended on the cathode in all cases except for those using the electrode selected from those prepared by EXAMPLES 36 and 38 and COMPARATIVE EXAMPLES 23 and 25, where the battery capacity depended on the anode.

Example 25

A coin-shaped lithium battery of the sectional structure shown in FIG. 4 was prepared. The procedures for preparing each battery member and assembling them into the battery are described below, by referring to FIG. 4.

(1) Anode

The anode 301 was prepared in an argon gas atmosphere by the following procedure:

1) The anode was prepared by pressing a 100 $\mu$m thick lithium metal foil to a 25 $\mu$m thick expanded metal.

2) The electrode prepared by the above step 1) was punched into a disc having a given diameter of 16 mm, to prepare the anode 301.

(2) Cathode

The electrode structure prepared by EXAMPLE 13 was punched into a disc having a given diameter of 15.7 mm, to prepare the cathode 303.

(3) Ion Conductor

The ion conductor 302 is prepared by holding the electrolyte solution, prepared by the following procedure, in a 25 $\mu$m thick microporous polypropylene film punched into a disc having a given diameter of 16.5 mm.

The electrolyte solution was prepared by the following procedure:

1) A mixed solvent of sufficiently dried ethylene carbonate (EC) and dimethyl carbonate (DMC) (weight ratio: 1:1) was prepared.

2) A lithium salt of tetrafluoroboric acid was dissolved in the mixed solvent prepared by the above step 1), to prepare the 1 M (mol/L) solution as the electrolyte solution.

(4) Assembling Members into Battery

The battery members were assembled into the battery by the following procedure in a dried atmosphere where moisture to cause dew point of −50° C. or less was controlled:

1) The cathode 303, a separator 302 operating as the ion conductor and a polypropylene gasket 306 were placed in the cathode case 305. The anode 301 was placed on the cathode 303 with the separator 302 in-between, into which the electrolyte solution was injected. The anode 301 was laminated onto the separator 302. A stainless steel spacer, not shown, was placed between the cathode 303 and anode 301 to keep a pressure between them. The cathode case was covered with the anode cap 304, and sealed by caulking to prepare the battery.

Example 26

The same procedure as used for EXAMPLE 25 was repeated, except that the anode and cathode were replaced by the following ones, to prepare the battery.

(1) Anode

The anode 301 was prepared by the following procedure:

1) N-methyl-2-pyrrolidone was added to a mixture of powdered graphite and polyvinylidene fluoride (weight ratio: 9:1) to form a paste.

2) The paste prepared by the above step 1) was spread over both sides of a 18 μm thick copper foil washed with acetone and isopropyl alcohol, and dried. It was coated with a 90 μm thick layer composed of graphite by roll-pressing, and dried at 150° C. under a vacuum.

3) The electrode prepared by the above step 2) was punched into a disc having a given diameter of 16 mm, to prepare the anode 301.

(2) Cathode

The electrode structure prepared by EXAMPLE 14 was punched into a disc having a given diameter of 15.7 mm, to prepare the cathode 303.

Example 27

The same procedure as used for EXAMPLE 25 was repeated, except that the cathode was replaced by the following one, to prepare the battery.

Cathode

The electrode structure prepared by EXAMPLE 15 was punched into a disc having a given diameter, to prepare the cathode 303.

Example 28

The same procedure as used for EXAMPLE 25 was repeated, except that the anode and cathode were replaced by the following ones, to prepare the battery.

(1) Anode

The anode 301 was prepared by the following procedure:

1) A 18 μm thick copper foil was washed with acetone and isopropyl alcohol, and dried. It was coated by electroplating with a 30 μm thick tin layer (first layer) of 10 μm or less in grain size on one side of the foil, using an electroplating solution of tin (an aqueous solution containing 40 g/L of tin (II) sulfate, 60 g/L of sulfuric acid and 2 g/L of gelatin) and current of 28 mA/cm², where the copper foil served as the cathode and a stainless steel plate as the opposite anode.

2) The electrode prepared by the above step 1) was punched into a disc having a given diameter, to prepare the anode 301.

(2) Cathode

The electrode structure prepared by EXAMPLE 16 was punched into a disc having a given diameter, to prepare the cathode 303.

Example 29

The same procedure as used for EXAMPLE 26 was repeated, except that the cathode was replaced by the following one, to prepare the battery.

Cathode

The electrode structure prepared by EXAMPLE 17 was punched into a disc having a given diameter, to prepare the cathode 303.

Example 30

The same procedure as used for EXAMPLE 26 was repeated, except that the cathode was replaced by the following one, to prepare the battery.

Cathode

The electrode structure prepared by EXAMPLE 18 was punched into a disc having a given diameter, to prepare the cathode 303.

Example 31

The same procedure as used for EXAMPLE 26 was repeated, except that the cathode was replaced by the following one, to prepare the battery.

Cathode

The electrode structure prepared by EXAMPLE 19 was punched into a disc having a given diameter, to prepare the cathode 303.

Example 32

The same procedure as used for EXAMPLE 28 was repeated, except that the cathode was replaced by the following one, to prepare the battery.

Cathode

The electrode structure prepared by EXAMPLE 20 was punched into a disc having a given diameter, to prepare the cathode 303.

Example 33

The same procedure as used for EXAMPLE 25 was repeated, except that the cathode was replaced by the following one, to prepare the battery.

Cathode

The electrode structure prepared by EXAMPLE 21 was punched into a disc having a given diameter, to prepare the cathode 303.

Example 34

The same procedure as used for EXAMPLE 26 was repeated, except that the cathode was replaced by the following one, to prepare the battery.

Cathode

The electrode structure prepared by EXAMPLE 22 was punched into a disc having a given diameter, to prepare the cathode 303.

Example 35

The same procedure as used for EXAMPLE 25 was repeated, except that the cathode was replaced by the following one, to prepare the battery.

Cathode

The electrode structure prepared by EXAMPLE 23 was punched into a disc having a given diameter, to prepare the cathode 303.

Example 36

The same procedure as used for EXAMPLE 25 was repeated, except that the anode and cathode were replaced by the following ones, to prepare the battery.

Anode

The electrode structure prepared by EXAMPLE 24 was punched into a disc having a given diameter, to prepare the anode 301.

Cathode

The electrode structure prepared by EXAMPLE 18 was punched into a disc having a given diameter, to prepare the cathode 303.

Example 37

The same procedure as used for EXAMPLE 26 was repeated, except that the ion conductor, and anode and cathode were replaced by the following ones, to prepare the battery.

Ion Conductor

A polymer gel electrolyte, prepared by the following procedure, was used as the lithium ion conductor 302:

1) A mixed solvent of the following composition was prepared in an argon gas atmosphere: methyl methacrylate as the monomer, ethylene glycol dimethacrylate as the cross-linking template agent, 2,2'-azobis-isobutyronitrile as the initiator and supporting electrolyte solution (1 mol/L solution of lithium fluorophosphate $LiPF_6$ dissolved in a mixture of propylene carbonate and ethylene carbonate (weight ratio: 1:1)) (weight ratio: 10:5:0.01:85).

2) A 30 μm thick non-woven fabric of polypropylene holding the mixed solvent prepared by the above step 1) was irradiated with ultraviolet ray for polymerization and cross-linking reactions, to prepare the film 302 of the polymer gel electrolyte with immobilized supporting electrolyte solution.

Treatment of Anode and Cathode

The anode and cathode were treated by the following procedure to have the interface of the above polymer gel between them, and punched to have a given size.

The electrode material layers on the anode and cathode were impregnated with a mixed solution of polyacrylonitrile, lithium fluorophosphate $LiPF_6$ and dimethyl carbonate (weight ratio: 1:1:8), dried and hot-pressed.

Assembling Members into Battery

The battery members were assembled into the battery by the following procedure in a dried atmosphere where moisture to cause dew point of −50° C. or less was controlled:

1) The cathode 303, placed in the cathode case 305, was impregnated with the 1 mol/L solution of lithium fluorophosphate $LiPF_6$ dissolved in a mixture of propylene carbonate and ethylene carbonate (weight ratio: 1:1) added dropwise. The polymer gel film 302 as the ion conductor was placed on the cathode 303, and polypropylene gasket 306 was placed on the gel film 302. The 1 mol/L solution of lithium fluorophosphate $LiPF_6$ dissolved in a mixture of propylene carbonate (weight ratio: 1:1) and ethylene carbonate was added dropwise onto the ion conductor, and the anode 301 was placed on the ion conductor 302. A stainless steel spacer, not shown, was placed between the cathode 303 and anode 301 to keep them pressed closely to each other. The cathode case 305 was covered with the anode cap 304, and sealed by caulking to prepare the battery.

Example 38

The same procedure as used for EXAMPLE 37 was repeated, except that the anode and cathode were replaced by the following ones, to prepare the battery.

Anode

The electrode structure prepared by EXAMPLE 24 was punched into a disc having a given diameter, to prepare the anode 301.

Cathode

The electrode structure prepared by EXAMPLE 18 was punched into a disc having a given diameter, to prepare the cathode 303.

Comparative Example 15

The same procedure as used for EXAMPLE 25 was repeated, except that the cathode was replaced by the following one, to prepare the battery.

Cathode

The electrode structure prepared by COMPARATIVE EXAMPLE 8 was punched into a disc having a given diameter, to prepare the cathode 303.

Comparative Example 16

The same procedure as used for EXAMPLE 26 was repeated, except that the cathode was replaced by the following one, to prepare the battery.

Cathode

The electrode structure prepared by COMPARATIVE EXAMPLE 9 was punched into a disc having a given diameter, to prepare the cathode 303.

Comparative Example 17

The same procedure as used for EXAMPLE 28 was repeated, except that the cathode was replaced by the following one, to prepare the battery.

Cathode

The electrode structure prepared by COMPARATIVE EXAMPLE 9 was punched into a disc having a given diameter, to prepare the cathode 303.

Comparative Example 18

The same procedure as used for EXAMPLE 29 was repeated, except that the cathode was replaced by the following one, to prepare the battery.

Cathode

The electrode structure prepared by COMPARATIVE EXAMPLE 10 was punched into a disc having a given diameter, to prepare the cathode 303.

Comparative Example 19

The same procedure as used for EXAMPLE 32 was repeated, except that the cathode was replaced by the following one, to prepare the battery.

Cathode

The electrode structure prepared by COMPARATIVE EXAMPLE 10 was punched into a disc having a given diameter, to prepare the cathode 303.

Comparative Example 20

The same procedure as used for EXAMPLE 33 was repeated, except that the cathode was replaced by the following one, to prepare the battery.

Cathode

The electrode structure prepared by COMPARATIVE EXAMPLE 11 was punched into a disc having a given diameter, to prepare the cathode 303.

Comparative Example 21

The same procedure as used for EXAMPLE 34 was repeated, except that the cathode was replaced by the following one, to prepare the battery.

Cathode

The electrode structure prepared by COMPARATIVE EXAMPLE 12 was punched into a disc having a given diameter, to prepare the cathode 303.

Comparative Example 22

The same procedure as used for EXAMPLE 35 was repeated, except that the cathode was replaced by the following one, to prepare the battery.

Cathode

The electrode structure prepared by COMPARATIVE EXAMPLE 13 was punched into a disc having a given diameter, to prepare the cathode 303.

Comparative Example 23

The same procedure as used for EXAMPLE 36 was repeated, except that the anode and cathode were replaced by the following ones, to prepare the battery.

Anode

The electrode structure prepared by COMPARATIVE EXAMPLE 14 was punched into a disc having a given diameter, to prepare the anode 301.

Cathode

The electrode structure prepared by COMPARATIVE EXAMPLE 10 was punched into a disc having a given diameter, to prepare the cathode 303.

Comparative Example 24

The same procedure as used for EXAMPLE 37 was repeated, except that the cathode was replaced by the following one, to prepare the battery.

Cathode

The electrode structure prepared by COMPARATIVE EXAMPLE 8 was punched into a disc having a given diameter, to prepare the cathode 303.

Comparative Example 25

The same procedure as used for EXAMPLE 38 was repeated, except that the anode and cathode were replaced by the following ones, to prepare the battery.

Anode

The electrode structure prepared by COMPARATIVE EXAMPLE 14 was punched into a disc having a given diameter, to prepare the anode 301.

Cathode

The electrode structure prepared by COMPARATIVE EXAMPLE 10 was punched into a disc having a given diameter, to prepare the cathode 303.

Assessment of Battery Characteristics

The charging and discharging tests were conducted for the batteries prepared by EXAMPLES 25 to 38 and COMPARATIVE EXAMPLES 15 to 25, to assess their characteristics.

Each battery was charged and discharged under the following conditions. The theoretical capacity predicted from mass of the metal oxide used for the cathode material layer was taken as the tentative battery capacity. The battery was charged to 4.2 V at a current level by which the tentative capacity could be charged or discharged in 10 h (0.1 C as 10-hour discharge rate), suspended for 30 min and then discharged to 2.8 V at the same current level as used for charging. These charging/discharging cycles were repeated 3 times, and the discharged capacity during the third discharging step was taken as the battery capacity. The subsequent charging/discharging tests were conducted under the following conditions: the battery was charged for 1 h at a current level of 1 C (by which the battery capacity determined above could be charged or discharged in 1 h), suspended for 30 min and discharged to 2.8 V at 1 C. These cycles were repeated 10 times, to determine the charge-discharge efficiency at the 10th cycle, discharged capacity per gram of the metal oxide for the cathode (or the anode for the batteries prepared by EXAMPLES 36 and 38 and COMPARATIVE EXAMPLES 23 and 25) at the 10th cycle, and cycle life.

The cut-off voltage for the charging was set at 4.5 V, and cycle life was number of cycles by which discharged capacity decreased below 60% of the battery capacity.

The battery performance test results are given in Table 1, where these characteristics are shown for a pair of the batteries prepared by EXAMPLE and COMPARATIVE EXAMPLE using the same type of the electrode material, with the characteristics of the former being normalized by those of the latter. Tables 2 and 3 describe the anode, cathode, electrode structure, and electrode material layer and metal oxide therefor of each battery given in Table 1.

TABLE 1

| Batteries prepared by EXAMPLES/COMPARATIVE EXAMPLES | Battery Characteristics, normalized by those of the battery by prepared COMPARATIVE EXAMPLE | | |
|---|---|---|---|
| | Charge-discharge efficiency | Capacity of Electrode Material | Cycle Life |
| EXAMPLE 25/COMPARATIVE EXAMPLE 15 | 1.03 | 1.14 | 1.2 |
| EXAMPLE 26/COMPARATIVE EXAMPLE 16 | 1.04 | 1.21 | 1.4 |
| EXAMPLE 27/COMPARATIVE EXAMPLE 15 | 1.04 | 1.12 | 1.3 |
| EXAMPLE 28/COMPARATIVE EXAMPLE 17 | 1.05 | 1.19 | 1.4 |
| EXAMPLE 29/COMPARATIVE EXAMPLE 18 | 1.05 | 1.17 | 1.3 |
| EXAMPLE 30/COMPARATIVE EXAMPLE 18 | 1.03 | 1.08 | 1.1 |
| EXAMPLE 31/COMPARATIVE EXAMPLE 18 | 1.04 | 1.12 | 1.2 |

TABLE 1-continued

| Batteries prepared by EXAMPLES/COMPARATIVE EXAMPLES | Charge-discharge efficiency | Capacity of Electrode Material | Cycle Life |
|---|---|---|---|
| EXAMPLE 32/COMPARATIVE EXAMPLE 19 | 1.04 | 1.09 | 1.2 |
| EXAMPLE 33/COMPARATIVE EXAMPLE 20 | 1.03 | 1.14 | 1.3 |
| EXAMPLE 34/COMPARATIVE EXAMPLE 21 | 1.04 | 1.12 | 1.2 |
| EXAMPLE 35/COMPARATIVE EXAMPLE 22 | 1.04 | 1.12 | 1.2 |
| EXAMPLE 36/COMPARATIVE EXAMPLE 23 | 1.03 | 1.15 | 1.3 |
| EXAMPLE 37/COMPARATIVE EXAMPLE 24 | 1.07 | 1.28 | 1.5 |
| EXAMPLE 38/COMPARATIVE EXAMPLE 25 | 1.08 | 1.23 | 1.6 |

Battery Characteristics, normalized by those of the battery by prepared COMPARATIVE EXAMPLE As shown in Table 1, the battery with the electrode of the metal oxide provided with ordered pores and capable of electrochemically intercalating or deintercalating the lithium ions has a higher charge-discharge efficency even at a high current density, larger discharging capacity and longer cycle life.

As described above, the present invention provides a structure of metal oxide as an electrode material, in a secondary battery which uses oxidation of lithium and reduction of lithium ion, high in charge-discharge efficiency even at a high current density, sufficiently bringing about the inherent material characteristics, long charge-discharge cycle life, and capable of intercalating and deintercalating the lithium ions. The present invention, therefore, provides an electrode structure and secondary battery of long cycle life, high capacity and high energy density.

What is claimed is:

1. A metal oxide having a porous structure, intercalating and deintercalating lithium ions by electrochemical reaction, and characterized by being provided with ordered pores, wherein all of said ordered pores are through-holes oriented substantially in one direction.

2. The metal oxide of claim 1, wherein said metal oxide has a layered structure running along said ordered pores.

TABLE 2

| Battery | Anode | Cathode | Electrode structure | Material | Metal oxide |
|---|---|---|---|---|---|
| EXAMPLE 25 | Li | EXAMPLE 13 | EXAMPLE 13 | EXAMPLE 1 | Mn oxide |
| EXAMPLE 26 | C | EXAMPLE 14 | EXAMPLE 14 | EXAMPLE 2 | Li—Mn oxide |
| EXAMPLE 27 | Li | EXAMPLE 15 | EXAMPLE 15 | EXAMPLE 3 | Mn oxide |
| EXAMPLE 28 | Sn | EXAMPLE 16 | EXAMPLE 16 | EXAMPLE 4 | Li—Mn oxide |
| EXAMPLE 29 | C | EXAMPLE 17 | EXAMPLE 17 | EXAMPLE 5 | Li—Ni oxide |
| EXAMPLE 30 | C | EXAMPLE 18 | EXAMPLE 18 | EXAMPLE 6 | Li—Ni oxide |
| EXAMPLE 31 | C | EXAMPLE 19 | EXAMPLE 19 | EXAMPLE 7 | Li—Ni oxide |
| EXAMPLE 32 | Sn | EXAMPLE 20 | EXAMPLE 20 | EXAMPLE 8 | Li—Ni oxide |
| EXAMPLE 33 | Li | EXAMPLE 21 | EXAMPLE 21 | EXAMPLE 9 | Li—V oxide |
| EXAMPLE 34 | C | EXAMPLE 22 | EXAMPLE 22 | EXAMPLE 10 | Li—Ni—V oxide |
| EXAMPLE 35 | Li | EXAMPLE 23 | EXAMPLE 23 | EXAMPLE 11 | Li—Mn—V oxide |
| EXAMPLE 36 | EXAMPLE 24 | EXAMPLE 18 | EXAMPLE 24 | EXAMPLE 12 | Li—Zn—V oxide |
| EXAMPLE 37 | C | EXAMPLE 14 | EXAMPLE 14 | EXAMPLE 2 | Li—Mn oxide |
| EXAMPLE 38 | EXAMPLE 24 | EXAMPLE 18 | EXAMPLE 24 | EXAMPLE 12 | Li—Zn—V oxide |

TABLE 3

| Battery | Anode | Cathode | Electrode structure | Material | Metal oxide |
|---|---|---|---|---|---|
| COMPARATIVE EXAMPLE 15 | Li | COMPARATIVE EXAMPLE 8 | COMPARATIVE EXAMPLE 8 | COMPARATIVE EXAMPLE 1 | Mn oxide |
| COMPARATIVE EXAMPLE 16 | C | COMPARATIVE EXAMPLE 9 | COMPARATIVE EXAMPLE 9 | COMPARATIVE EXAMPLE 2 | Li—Mn oxide |
| COMPARATIVE EXAMPLE 17 | Sn | COMPARATIVE EXAMPLE 9 | COMPARATIVE EXAMPLE 9 | COMPARATIVE EXAMPLE 2 | Li—Mn oxide |
| COMPARATIVE EXAMPLE 18 | C | COMPARATIVE EXAMPLE 10 | COMPARATIVE EXAMPLE 10 | COMPARATIVE EXAMPLE 3 | Li—Ni oxide |
| COMPARATIVE EXAMPLE 19 | Sn | COMPARATIVE EXAMPLE 10 | COMPARATIVE EXAMPLE 10 | COMPARATIVE EXAMPLE 3 | Li—Ni oxide |
| COMPARATIVE EXAMPLE 20 | Li | COMPARATIVE EXAMPLE 11 | COMPARATIVE EXAMPLE 11 | COMPARATIVE EXAMPLE 4 | Li—V oxide |
| COMPARATIVE EXAMPLE 21 | C | COMPARATIVE EXAMPLE 12 | COMPARATIVE EXAMPLE 12 | COMPARATIVE EXAMPLE 5 | Li—Ni—V oxide |
| COMPARATIVE EXAMPLE 22 | Li | COMPARATIVE EXAMPLE 13 | COMPARATIVE EXAMPLE 13 | COMPARATIVE EXAMPLE 6 | Li—Mn—V oxide |
| COMPARATIVE EXAMPLE 23 | EXAMPLE 14 | COMPARATIVE EXAMPLE 10 | COMPARATIVE EXAMPLE 14 | COMPARATIVE EXAMPLE 7 | Li—Zn—V oxide |
| COMPARATIVE EXAMPLE 24 | C | COMPARATIVE EXAMPLE 8 | COMPARATIVE EXAMPLE 8 | COMPARATIVE EXAMPLE 1 | Li—Mn oxide |
| COMPARATIVE EXAMPLE 25 | EXAMPLE 14 | COMPARATIVE EXAMPLE 10 | COMPARATIVE EXAMPLE 14 | COMPARATIVE EXAMPLE 7 | Li—Zn—V oxide |

3. The metal oxide of claim 1, wherein a diameter of said pores is in a range from 0.5 to 20 nm.

4. The metal oxide of claim 1, wherein a diameter of said pores is in a range from 1 to 10 nm.

5. The metal oxide of claim 1, wherein said pores are 0.5 to 20 nm apart from each other.

6. The metal oxide of claim 1, wherein said pores are 1 to 10 nm apart from each other.

7. The metal oxide of claim 1, wherein said metal oxide has a specific surface area of 10 $m^2/g$ or more.

8. The metal oxide of claim 1, wherein said metal oxide has a specific surface area of 100 $m^2/g$ or more.

9. The metal oxide of claim 1, wherein said metal oxide is selected from the group consisting of tin oxides, transition metal oxides, lithium-tin oxides and lithium-transition metal oxides.

10. The metal oxide of claim 1, wherein said metal oxide is powdery or fibrous.

11. A method for producing the metal oxide of porous structure claimed by one of claims 1 to 10, provided with ordered pores and intercalating or deintercalating lithium ions by the electrochemical reaction, at least comprising a step of mixing the starting metal compound, solvent and template agent having interactions with the starting metal compound to configure the ordered porous metal oxide.

12. The method for producing a metal oxide of porous structure of claim 11, comprising steps of forming the metal hydroxide by chemical reaction and calcining the metal hydroxide, after the mixing step.

13. The method for producing a metal oxide of porous structure of claim 11, comprising a step of spraying the mixed solution for pyrolysis.

14. The method for producing a metal oxide of porous structure of claim 11, comprising a thermal treatment step effected at 250 to 800° C.

15. The method for producing a metal oxide of porous structure of claim 11, wherein said template agent for configuring the ordered porous metal oxide is a liquid-crystalline compound.

16. The method for producing a metal oxide of porous structure of claim 15, wherein said liquid-crystalline compound is lyotropic.

17. The method for producing a metal oxide of porous structure of claim 16, wherein said lyotropic liquid-crystalline compound is at least one compound selected from the group consisting of a soap, surfactant, lipid and amphipathic compound.

18. The method for producing a metal oxide of porous structure of claim 11, wherein said starting metal compound is a nitrate, carbonate, organic acid salt, halide, alkoxide, acetylacetone complex or chelate complex.

19. An electrode structure to be used as the electrode for a secondary battery which uses oxidation of lithium and reduction of lithium ion, at least comprising the metal oxide of porous structure claimed by one of claims 1 to 10, provided with ordered pores and intercalating or deintercalating lithium ions by the electrochemical reaction.

20. The electrode of claim 19, at least composed of said metal oxide, a binder and collector.

21. The electrode of claim 19, at least composed of said metal oxide, an electroconductive auxiliary material, binder and collector.

22. A secondary battery which uses oxidation of lithium and reduction of lithium ion, and is at least composed of an anode, electrolyte and cathode, wherein at least the electrode structure of claim 20 is used.

23. A secondary battery which uses oxidation of lithium and reduction of lithium ion, and is at least composed of an anode, electrolyte and cathode, wherein at least the electrode structure of claim 20 is used.

24. A secondary battery which uses oxidation of lithium and reduction of lithium ion, and is at least composed of an anode, electrolyte and cathode, wherein at least the electrode structure of claim 21 is used.

* * * * *

UNITED STATES PATENT AND TRADEMARK OFFICE
CERTIFICATE OF CORRECTION

PATENT NO.    : 6,558,847 B1
DATED         : May 6, 2003
INVENTOR(S)   : Soichiro Kawakami et al.

It is certified that error appears in the above-identified patent and that said Letters Patent is hereby corrected as shown below:

Title page,
Item [56], References Cited, FOREIGN PATENT DOCUMENTS,
"8-3213000" should read -- 8-321300 --.
Insert item: -- [74] *Attorney, Agent or Firm* - Fitzpatrick, Cella, Harper & Scinto --.

Column 9,
Line 20, "Ad" should be deleted.
Line 21, "-include" should read -- include --.

Column 28,
Line 27, "claim 20" should read -- claim 19 --.

Signed and Sealed this

Third Day of February, 2004

JON W. DUDAS
*Acting Director of the United States Patent and Trademark Office*